Sept. 3, 1940. G. W. HEISE ET AL 2,213,428
ELECTRIC CELL AND REPLACEMENT UNIT THEREFOR
Filed Jan. 9, 1937

INVENTORS
GEORGE W. HEISE
ERWIN A. SCHUMACHER
BY
ATTORNEY

Patented Sept. 3, 1940

2,213,428

UNITED STATES PATENT OFFICE 2,213,428

ELECTRIC CELL AND REPLACEMENT UNIT THEREFOR

George W. Heise, Rocky River, and Erwin A. Schumacher, Lakewood, Ohio, assignors to National Carbon Company, Inc., a corporation of New York Application January 9, 1937, Serial No. 119,746

12 Claims. (Cl. 136—90)

This invention relates to primary and secondary electric cells and provides an assembled replacement unit for use in connection with such cells.

The invention will be particularly described in connection with air-depolarized cells having zinc and carbon electrodes operating in a caustic alkali electrolyte, but the invention is well adapted for use in connection with other types of cells. Furthermore, the invention will be described in connection with cells of the deferred action type, which are made ready for service by the addition of water or electrolyte, but it may also be used in connection with other cells, of both the wet and the dry types.

Wherever relatively large batteries of electric cells are used, for instance for operating railway signal systems, it is convenient to provide more or less permanently installed cell containers, and to renew the electrode and electrolyte from time to time as they may become exhausted from use. In such installations it is convenient to determine the condition and extent of exhaustion of the individual cells by mere visual inspection.

The objects of this invention include the provision of a unitary cell assembly which may be inserted in a permanent outer container and prepared for active service by the simple addition of water or electrolyte; of a non-rigid inner container for electrolyte included as part of said assembly and adapted to protect the active elements of said assembly during shipment and use; of an assembled unit which can be inserted in and removed from an outer container without unusual difficulty and without danger of spilling corrosive electrolyte material; of a cell construction which may be used in batteries of cells without the necessity for providing a separate insulating material for separating the individual cells of the battery; and of a unitary cell assembly which permits visual inspection of the cell condition without removal of the electrode assembly from the inner electrolyte container. These and other objects of the invention are attained according to the invention described below in reference to the accompanying drawing, in which:

Figure 1:
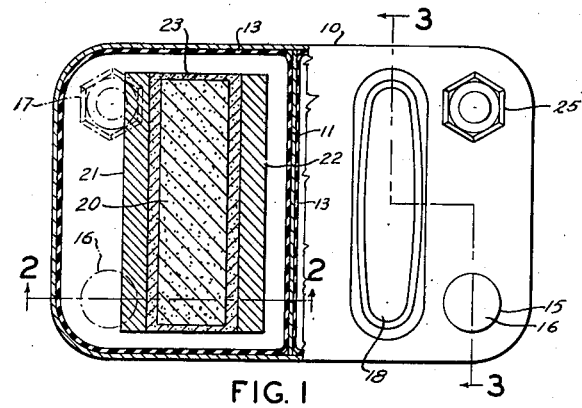
Fig. 1 is a top view of a battery of two cells illustrating one embodiment of our invention, a portion of the cells being shown in section on the line 1—1 of Fig. 2.

In accordance with the invention, there is provided a replacement unit for electric cells of the deferred action type, comprising a cell cover, electrodes supported by the cover, a cast of electrolyte-forming material supported by at least one of the electrodes, and a flexible envelope surrounding the electrodes and secured to the cover by an electrolyte-proof joint to form an electrolyte container; at least a portion of the envelope being sufficiently transparent to permit visual inspection of its contents.

In accordance with the invention, there is also provided a primary electric cell replacement unit adapted to be inserted in a rigid outer cell case compartment when new and removed from such compartment when exhausted so that the useful life of the case extends over the useful lives of a plurality of such replacement units, the replacement unit comprising a rigid cell cover; electrodes secured to the cover; solid electrolyte-forming material associated with the electrodes; and a flexible electrolyte-proof envelope secured to the cover and enclosing the electrodes and electrolyte-forming material to provide a compact storage and shipping package, the envelope being of such size and flexibility as to permit it to be folded closely about its contents during storage and shipment and to permit it to distend and conform to the interior surface of said compartment when partially full of liquid electrolyte.

More particularly, in accordance with the invention, there is provided a replacement unit for use with a cell compartment of an air-depolarized primary battery, such compartment being formed of rigid material and having an open top; the replacement unit comprising a rigid cover adapted to close said open top and having two openings, one of the openings constituting a water filling opening, a removable plug normally closing the latter, the other opening constituting an opening to receive the end of a carbon electrode and expose the latter to the atmosphere, a removable seal temporarily closing such other opening to prevent such exposure, a carbon electrode secured to the cover and having one end projecting into such other opening, a zinc electrode secured to said cover and operatively associated with said carbon electrode, solid electrolyte-forming material associated with said electrodes, and envelope comprising flexible electrolyte-resistant insulating material secured and sealed to said cover so as to communicate with the filling opening and enclosing the electrolyte-forming material and the portions of the electrodes associated therewith. The construction and arrangement of the unit is such that the electrodes and electrolyte-forming material are completely protected from the atmosphere during storage and shipment of the unit and, when the unit is assembled relatively to the cell compartment to replace a similar but exhausted unit, the cover closes the compartment, the envelope and said electrodes and electrolyte-forming material depend from the cover into the compartment, and water to provide a liquid electrolyte may be introduced through the filling opening into the envelope and thereby distend the latter into supporting engagement with the interior surface of the compartment.

In the drawing is shown a two-cell battery including an open box-like outer casing 10 divided into two compartments by a partition 11. For each compartment there is a cover 14 supported on a beaded portion 12 of the casing 10 and the partition 11 and provided with an opening 15 closable with a suitable plug 16. From the cover 14 depend a porous carbon cathode 20 and zinc anodes 21 and 22. The carbon cathode 20 protrudes through the cover 14 and may be protected prior to use of the cell by a removable seal 18. The anodes 21 and 22 are electrically connected to a suitable binding post 17 supported by the cover 14. The cathode 20 is electrically connected to the anodes of the companion cell of the battery, and the cathode of the latter cell is electrically connected to a suitable binding post 25. Electrolyte-forming material 23, such as hydrated caustic soda, approximating the composition NaOH.H₂O may be cast around the cathode 20 and one or both of the anodes 21 and 22. Attached to the cover 14 by an electrolyte-proof joint, and surrounding the cathode 20, anodes 21 and 22, electrolyte-forming material 23, and the lower end of the opening 15, is an inner, electrolyte-resistant, insulating bag or envelope 13. If desired, an electrolyte level indicator 19 and electrolyte extenders or regenerators such as lime or lime-cellulose mixtures (not shown) may be placed within the envelope 13.

Figure 4:
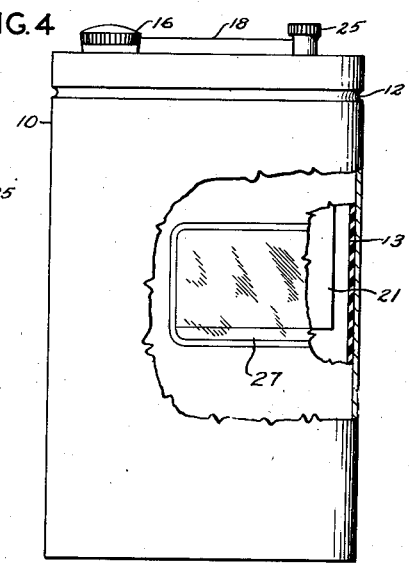
Fig. 4 is an end view of a battery, a portion being in section, showing a modification of the invention.
Figure 2:
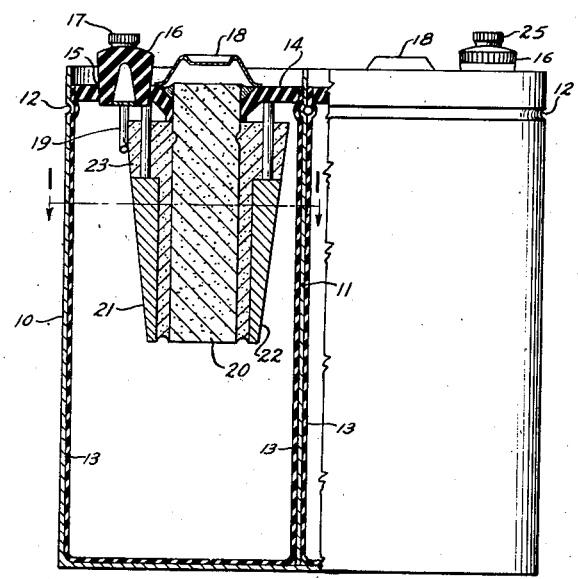
Fig. 2 is an elevation of said battery, a portion being in section on the line 2—2 of Fig. 1.
Figure 3:
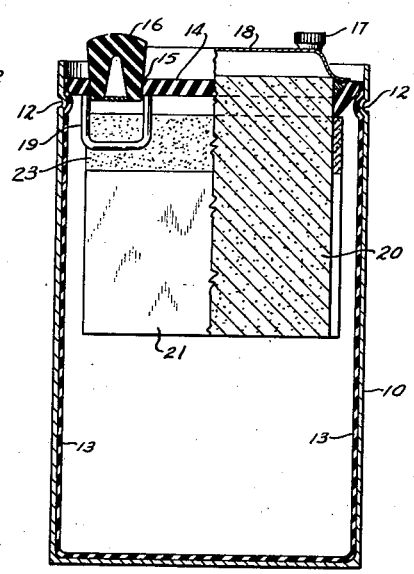
Fig. 3 is a section on the line 3—3 of Fig. 1.

According to the present invention, the envelope 13 is sufficiently flexible and elastic to permit it to be folded closely about its contents during shipment and storage, so as to protect those contents, and to permit it to distend to fill a compartment of the outer container when it is placed therein and when water or electrolyte is added through the opening 15. The said envelope preferably permits visual inspection of its contents, either because it is translucent or transparent in its entirety when wet or because it is provided with a translucent or transparent window portion 27 as shown in Figure 4.

The envelope 13 may be made entirely of rubber, or of rubber provided with a cemented-in inspection window 27 of transparent or translucent material. Alternatively, the entire envelope may be made of transparent or translucent material.

Certain so-called "artificial rubber" compositions are translucent or transparent when formed into sheets, sometimes becoming more transparent when wet, and they are also extremely flexible and "elastic." Such materials include those formed by the polymerization of 2-chlorbutadiene 1,3 and its homologues; the plastic olefine-polysulfides such as are formed by the condensation of olefine dihalides with sulfides, for example ethylene dichloride with sodium sulfide; and thermoplastic materials resulting from the isomerization of natural rubber by the action of halogenated reagents. Other transparent or translucent flexible materials, which do not, however, have the rubber-like elasticity of the artificial rubber compositions, include certain of the synthetic resins, for instance resins such as may be formed by the conjoint polymerization of a vinyl halide (e. g. vinyl chloride) with a vinyl ester of an aliphatic acid (e. g. vinyl acetate), and to which various plasticizers and other known modifying substances may be added. Any of these materials may be used, either for the entire envelope 13 or for the window 27.

Inasmuch as the envelope 13 is electrolyte resistant and an electrical insulator, the outer container 10 need not have either of these properties but may be fabricated, for instance, by welding or soldering ordinary sheet steel or other inexpensive metal.

When the improved cell unit of the invention has become exhausted, it may be removed in its entirety and thrown away. A new unit is then installed in the casing 10, water or electrolyte added, and the battery is again ready for service. Thus the invention permits the continued use of a more or less permanent outer container, provides a compact, light weight, durable shipping unit for renewal purposes, and allows visual inspection of cell condition without requiring the provision of a container of glass or other easily breakable transparent material.

While specific modifications of the invention have been shown and described, it should be understood that the invention is not necessarily limited thereto, as the principles of the invention may be embodied in other modifications without departing from the spirit of the invention.

We claim:

1. A replacement unit for electric cells of the deferred action type, comprising a cell cover, electrodes supported by said cover, a cast of electrolyte-forming material supported by at least one of said electrodes, and a flexible envelope surrounding said electrodes and secured to said cover by an electrolyte-proof joint to form an electrolyte container; at least a portion of said envelope being sufficiently transparent to permit visual inspection of its contents.

2. A primary electric cell replacement unit adapted to be inserted in a rigid outer cell case compartment when new and removed from such compartment when exhausted so that the useful life of the case extends over the useful lives of a plurality of such replacement units, said replacement unit comprising a rigid cell cover; electrodes secured to said cover; solid electrolyte-forming material associated with said electrodes; and a flexible electrolyte-proof envelope secured to said cover and enclosing said electrodes and electrolyte-forming material to provide a compact storage and shipping package, said envelope being of such size and flexibility as to permit it to be folded closely about its contents during storage and shipment and to permit it to distend and conform to the interior surface of said compartment when partially full of liquid electrolyte.

3. The combination with a box-like outer metal casing having an open top and an internal horizontal bead spaced therefrom; of an electric cell unit disposed within said casing and comprising a flexible, electrolyte-proof, transparent bag in supported contact with the interior surface of said casing, the upper edge of said bag extending above said bead, a rigid cover having its periphery disposed within and sealed to said bag, adjacent its upper edge, and electrodes depending from said cover into said bag; the weight of said cover and electrodes being carried by said bead by virtue of the fact that said cover rests on said bead; the arrangement being such that said electric cell unit is adapted to be withdrawn from said casing at will by lifting said cover from said casing, whereby the contents thereof may be inspected through said transparent bag.

4. The combination with an outer casing having an open top and an internal horizontal bead spaced therefrom; of an electric cell unit disposed within said casing and comprising a flexible bag in supported contact with said casing, the upper edge of said bag extending above said bead, a rigid cover having its periphery disposed within and sealed to the upper edge of said bag, and electrodes depending from said cover; the weight of said cover and electrodes being carried by said bead by virtue of the fact that said cover rests on said bead; the arrangement being such that said electric cell unit is adapted to be withdrawn from said casing at will by lifting the same from said casing.

5. A replacement unit for electric cells comprising a rigid cover, electrodes and solid electrolyte-forming material connected to said cover, and a bag secured to said cover to house said electrodes and material and adapted to be folded about said electrodes and material to provide a dry self-contained shipping and storage package, said bag being adapted also to provide a vessel for receiving water and containing a liquid electrolyte in use; said unit being adapted to be inserted in a rigid outer casing means from which said unit may be manually withdrawn at will.

6. The combination with a rigid outer casing having an open top; of an air-depolarized cell unit comprising a flexible bag, a rigid cover for said bag, electrodes depending from said cover into said bag, and an electrolyte-forming casting surrounding said electrodes; said bag being foldable about said electrodes and casting for storage and shipment and thereby providing a lightweight dry package; and when the unit is disposed within said casing, said bag providing a liquid tight container into which water may be introduced for the purpose of dissolving said casting to provide a liquid electrolyte, the unit thereafter being withdrawable from said casing as desired.

7. A replacement unit for use with a cell compartment of an air-depolarized battery, such compartment being formed of rigid material and having an open top; said replacement unit comprising a rigid cover adapted to close said open top and having two openings, one of said openings constituting a filling opening for electrolyte, a removable plug normally closing said opening, the other of said openings constituting an opening to receive the end of a carbon electrode and expose the latter to the atmosphere, a removable seal temporarily closing such other opening to prevent such exposure, a carbon electrode secured to said cover and having one end projecting into such other opening, a zinc electrode secured to said cover and operatively associated with said carbon electrode, an envelope comprising flexible electrolyte-resistant insulating material secured and sealed to said cover so as to communicate with said filling opening and enclosing at least portions of said electrodes, the construction and arrangement of said unit being such that said electrodes are completely protected from the atmosphere during storage and shipment of said unit and, when said unit is assembled relatively to said cell compartment to replace a similar but exhausted unit, said cover closes said compartment, said envelope and said electrodes depend from said cover into said compartment, and a liquid electrolyte may be introduced through said filling opening into said envelope and thereby distend the latter into supporting engagement with the interior surface of said compartment.

8. A replacement unit for use with a cell compartment of an air-depolarized primary battery, such compartment being formed of rigid material and having an open top; said replacement unit comprising a rigid cover adapted to close said open top and having two openings, one of said openings constituting a water filling opening, a removable plug normally closing the latter, the other of said openings constituting an opening to receive the end of a carbon electrode and expose the latter to the atmosphere, a removable seal temporarily closing such other opening to prevent such exposure, a carbon electrode secured to said cover and having one end projecting into such other opening, a zinc electrode secured to said cover and operatively associated with said carbon electrode, solid electrolyte-forming material associated with said electrodes, an envelope comprising flexible electrolyte-resistant insulating material secured and sealed to said cover so as to communicate with said filling opening and enclosing said electrolyte-forming material and the portions of said electrodes associated therewith, the construction and arrangement of said unit being such that said electrodes and electrolyte-forming material are completely protected from the atmosphere during storage and shipment of said unit and, when said unit is assembled relatively to said cell compartment to replace a similar but exhausted unit, said cover closes said compartment, said envelope and said electrodes and electrolyte-forming material depend from said cover into said compartment, and water to provide a liquid electrolyte may be introduced through said filling opening into said envelope and thereby distend the latter into supporting engagement with the interior surface of said compartment.

9. As a new article of manufacture, a package comprising a substantially rigid cover having a normally closed opening, electrode means mounted on said cover, means comprising electrolyte-forming material connected to said cover, and an electrolyte-resistant insulating envelope attached to said cover by an electrolyte-proof joint and surrrounding and folded about said electrode means nad said electrolyte-forming material, said envelope being adapted to be distended when a fluid is added through said opening in the cover to provide an electric cell.

10. As a new article of manufacture, a package comprising a substantially rigid cover, electrode means mounted on said cover, means comprising electrolyte-forming material connected to said cover, and an electrolyte-resistant insulating envelope attached to said cover and surrounding and folded about said electrode means and said electrolyte-forming material, said envelope being adapted to be distended when a fluid is added to provide an electric cell.

11. As a new article of manufacture, a package comprising a substantially rigid cover, electrode means mounted on said cover, means comprising electrolyte-forming material connected to said cover, and an electrolyte-resistant transparent envelope attached to said cover and surrounding and folded about said electrodes and said means, said envelope being adapted to be distended when a fluid is added to provide an electric cell.

12. As a new article of manufacture, a package comprising a substantially rigid cover, electrode means mounted on said cover, means comprising electrolyte-forming material, and an electrolyte-resistant insulating envelope attached to said cover and surrounding and folded about said electrode means and said electrolyte-forming material, said envelope being adapted to be distended when a fluid is added to provide an electric cell.

GEORGE W. HEISE.
ERWIN A. SCHUMACHER.